(12) United States Patent
Ford

(10) Patent No.: US 9,248,778 B2
(45) Date of Patent: Feb. 2, 2016

(54) MESH LIGHTING SYSTEM FOR EMERGENCY VEHICLES

(75) Inventor: Timothy D. F. Ford, Beaconsfield (CA)

(73) Assignee: THE FLEWELLING FORD FAMILY TRUST, Beaconsfield (CA)

( * ) Notice: Subject to any disclaimer, the term of this patent is extended or adjusted under 35 U.S.C. 154(b) by 516 days.

(21) Appl. No.: 13/010,338

(22) Filed: Jan. 20, 2011

(65) Prior Publication Data

US 2011/0175719 A1 Jul. 21, 2011

Related U.S. Application Data

(60) Provisional application No. 61/296,587, filed on Jan. 20, 2010.

(51) Int. Cl.
*B60Q 7/00* (2006.01)
*B60Q 1/52* (2006.01)
*B60Q 1/26* (2006.01)

(52) U.S. Cl.
CPC ............... *B60Q 1/52* (2013.01); *B60Q 1/2611* (2013.01); *B60Q 1/2615* (2013.01); *B60Q 2900/10* (2013.01); *B60Q 2900/30* (2013.01)

(58) Field of Classification Search
USPC ......... 340/425.5, 468, 471, 472, 473, 815.45, 340/902, 904, 906
See application file for complete search history.

(56) References Cited

U.S. PATENT DOCUMENTS

| | | | | |
|---|---|---|---|---|
| 2,217,124 A * | 10/1940 | Massure | ................. | 220/812 |
| 3,148,923 A * | 9/1964 | Smith | ................. | 312/201 |
| 3,380,573 A * | 4/1968 | Gulotta | ................. | 206/370 |
| 3,653,567 A * | 4/1972 | Selvaggio | ................. | 224/540 |
| 3,677,451 A * | 7/1972 | Burland | ................. | 224/322 |
| 3,729,707 A * | 4/1973 | Gaetano | ................. | 340/473 |
| 3,732,537 A * | 5/1973 | Freeman | ................. | 340/472 |
| 3,739,336 A * | 6/1973 | Burland | ................. | 340/472 |
| 3,919,543 A * | 11/1975 | Noren | ................. | 362/293 |
| 3,947,815 A * | 3/1976 | Muncheryan | ................. | 340/575 |
| 4,004,274 A * | 1/1977 | Menke et al. | ................. | 340/472 |
| 4,125,305 A * | 11/1978 | Kasindorf | ................. | 312/332.1 |
| 4,189,709 A * | 2/1980 | Gosswiller | ................. | 340/472 |
| 4,212,085 A * | 7/1980 | Vaillancour et al. | ................. | 367/124 |
| 4,218,763 A * | 8/1980 | Kelley et al. | ................. | 340/429 |
| 4,511,880 A * | 4/1985 | Stanuch | ................. | 340/472 |
| 4,595,904 A * | 6/1986 | Gosswiller et al. | ................. | 340/472 |
| 4,635,039 A * | 1/1987 | Gosswiller | ................. | 340/404.1 |
| 4,736,186 A * | 4/1988 | Jones | ................. | 340/331 |

(Continued)

FOREIGN PATENT DOCUMENTS

WO    WO 9820276 A1 *    5/1998    ............... F21L 7/00

OTHER PUBLICATIONS

International Search Report issued in corresponding international application PCT/CA2011/050031.

*Primary Examiner* — Travis Hunnings
(74) *Attorney, Agent, or Firm* — Goudreau Gage Dubuc; Hugh Mansfield

(57) ABSTRACT

A mesh lighting system for emergency vehicles and method for retrofitting a vehicle with emergency lights is disclosed. The system comprises a plurality of independent signalling light sources each supplied by a dedicated source of energy, a control module, and a low powered wireless network connecting said control module with the plurality of light sources. The plurality of independent signalling light sources emit at least one light flash in response to a control signal received from the control module.

15 Claims, 10 Drawing Sheets

(56) References Cited

U.S. PATENT DOCUMENTS

| | | | |
|---|---|---|---|
| 4,808,969 A * | 2/1989 | Human | 340/468 |
| 4,831,357 A * | 5/1989 | Miller | 340/472 |
| 4,859,982 A | 8/1989 | Seaburg | |
| 5,097,397 A * | 3/1992 | Stanuch et al. | 362/493 |
| 5,140,304 A * | 8/1992 | Miller | 340/472 |
| 5,307,060 A * | 4/1994 | Prevulsky et al. | 340/902 |
| 5,371,802 A * | 12/1994 | McDonald et al. | 381/71.4 |
| 5,422,623 A * | 6/1995 | Bader et al. | 340/331 |
| 5,434,758 A | 7/1995 | Zeidler | |
| 5,552,780 A * | 9/1996 | Knockeart | 340/991 |
| 5,586,571 A * | 12/1996 | Guillermo | 137/315.41 |
| 5,624,029 A * | 4/1997 | Shih | 206/372 |
| 5,644,291 A * | 7/1997 | Jozwik | 340/472 |
| 5,666,103 A * | 9/1997 | Davis, Jr. | 340/479 |
| 5,736,925 A * | 4/1998 | Knauff et al. | 340/468 |
| 5,782,549 A * | 7/1998 | Glatzmeier et al. | 362/485 |
| 5,884,997 A * | 3/1999 | Stanuch et al. | 362/493 |
| 5,931,573 A * | 8/1999 | Knox | 362/493 |
| 6,081,191 A * | 6/2000 | Green et al. | 340/472 |
| 6,140,918 A * | 10/2000 | Green et al. | 340/468 |
| 6,184,786 B1 * | 2/2001 | Medeiros | 340/463 |
| 6,195,000 B1 * | 2/2001 | Smith et al. | 340/471 |
| 6,304,174 B1 * | 10/2001 | Smith et al. | 340/471 |
| 6,461,008 B1 * | 10/2002 | Pederson | 362/35 |
| 6,476,726 B1 * | 11/2002 | Pederson | 340/815.45 |
| 6,492,897 B1 * | 12/2002 | Mowery, Jr. | 455/522 |
| 6,538,568 B2 * | 3/2003 | Conley, III | 340/540 |
| 6,562,013 B1 * | 5/2003 | Marasco, Jr. | 604/290 |
| 6,590,502 B1 * | 7/2003 | Pederson | 340/815.4 |
| 6,614,359 B2 * | 9/2003 | Pederson | 340/815.45 |
| 6,623,151 B2 * | 9/2003 | Pederson | 362/542 |
| 6,693,551 B2 * | 2/2004 | Pederson | 340/815.45 |
| 6,700,502 B1 * | 3/2004 | Pederson | 340/815.45 |
| 6,744,359 B1 * | 6/2004 | Wasilewski et al. | 340/467 |
| 6,754,602 B1 * | 6/2004 | Tkachenko et al. | 702/108 |
| 6,773,132 B2 * | 8/2004 | Gilligan et al. | 362/119 |
| 6,789,930 B2 * | 9/2004 | Pederson | 362/545 |
| 6,814,459 B2 * | 11/2004 | Pederson | 362/35 |
| 6,879,263 B2 * | 4/2005 | Pederson et al. | 340/815.45 |
| 6,940,422 B1 * | 9/2005 | Bachelder et al. | 340/906 |
| 6,989,743 B2 * | 1/2006 | Pederson | 340/815.45 |
| 7,033,036 B2 * | 4/2006 | Pederson | 362/35 |
| 7,036,965 B2 * | 5/2006 | Dalton et al. | 362/488 |
| 7,038,593 B2 * | 5/2006 | Pederson | 340/815.45 |
| 7,046,160 B2 * | 5/2006 | Pederson et al. | 340/815.45 |
| 7,064,674 B2 * | 6/2006 | Pederson | 340/815.45 |
| 7,080,930 B2 * | 7/2006 | Pederson | 362/545 |
| 7,095,334 B2 * | 8/2006 | Pederson | 340/815.45 |
| 7,153,013 B2 * | 12/2006 | Pederson | 362/543 |
| 7,163,324 B2 * | 1/2007 | Pederson | 362/540 |
| 7,347,597 B2 * | 3/2008 | French | 362/485 |
| 7,446,650 B2 * | 11/2008 | Scholfield et al. | 340/438 |
| 7,449,998 B1 * | 11/2008 | Au et al. | 340/468 |
| 7,476,013 B2 | 1/2009 | Gergets et al. | |
| D594,769 S * | 6/2009 | Shin | D10/114.4 |
| 7,561,036 B2 * | 7/2009 | Pederson | 340/463 |
| 7,573,396 B2 * | 8/2009 | Stokes | 340/693.2 |
| 7,589,622 B2 * | 9/2009 | Farley | 340/468 |
| 7,656,307 B2 * | 2/2010 | Yatsuda et al. | 340/815.45 |
| 7,821,380 B1 * | 10/2010 | Grote, Jr. | 340/384.4 |
| 7,825,790 B2 * | 11/2010 | Tallinger | 340/472 |
| D630,959 S * | 1/2011 | Stuesse et al. | D10/114.4 |
| 8,040,226 B2 * | 10/2011 | Birging et al. | 340/436 |
| 8,077,011 B2 * | 12/2011 | McBride et al. | 340/5.72 |
| 2002/0036908 A1 * | 3/2002 | Pederson | 362/545 |
| 2002/0048174 A1 * | 4/2002 | Pederson | 362/487 |
| 2002/0071268 A1 * | 6/2002 | Pederson | 362/35 |
| 2002/0105432 A1 * | 8/2002 | Pederson et al. | 340/815.45 |
| 2003/0020626 A1 * | 1/2003 | Pederson | 340/815.45 |
| 2003/0021121 A1 * | 1/2003 | Pederson | 362/493 |
| 2003/0025608 A1 * | 2/2003 | Pederson | 340/815.45 |
| 2003/0030547 A1 * | 2/2003 | Pederson | 340/425.5 |
| 2003/0043972 A1 * | 3/2003 | Burnham et al. | 379/56.3 |
| 2003/0107749 A1 * | 6/2003 | Aquilina | 358/1.1 |
| 2004/0085219 A1 * | 5/2004 | Pederson | 340/815.4 |
| 2004/0125609 A1 * | 7/2004 | Gilligan et al. | 362/486 |
| 2004/0145490 A1 * | 7/2004 | Pederson | 340/815.45 |
| 2004/0160334 A1 * | 8/2004 | Pederson | 340/815.45 |
| 2004/0208013 A1 * | 10/2004 | Dalton et al. | 362/488 |
| 2004/0252021 A1 * | 12/2004 | Frank et al. | 340/472 |
| 2005/0017856 A1 * | 1/2005 | Peterson | 340/431 |
| 2005/0094385 A1 * | 5/2005 | Lee | 362/98 |
| 2005/0099317 A1 * | 5/2005 | Pederson | 340/815.45 |
| 2005/0231381 A1 * | 10/2005 | Pederson et al. | 340/815.45 |
| 2005/0237219 A1 * | 10/2005 | Pederson | 340/815.45 |
| 2006/0040714 A1 * | 2/2006 | Suzuki | 455/569.1 |
| 2006/0120095 A1 * | 6/2006 | Lin | 362/523 |
| 2006/0187670 A1 * | 8/2006 | Dalton et al. | 362/503 |
| 2006/0238368 A1 * | 10/2006 | Pederson et al. | 340/815.45 |
| 2006/0244623 A1 * | 11/2006 | Pederson | 340/815.45 |
| 2006/0273121 A1 * | 12/2006 | Thomas | 224/322 |
| 2007/0024461 A1 * | 2/2007 | Pederson et al. | 340/815.45 |
| 2007/0030351 A1 * | 2/2007 | Blanco et al. | 348/148 |
| 2007/0097700 A1 * | 5/2007 | Pederson | 362/555 |
| 2007/0159354 A1 * | 7/2007 | Rosenberg | 340/902 |
| 2007/0200672 A1 * | 8/2007 | McBride et al. | 340/5.72 |
| 2007/0216523 A1 * | 9/2007 | Bader et al. | 340/468 |
| 2008/0031004 A1 * | 2/2008 | Chu | 362/545 |
| 2008/0036582 A1 * | 2/2008 | Farley | 340/468 |
| 2008/0036583 A1 * | 2/2008 | Canfield | 340/468 |
| 2008/0079555 A1 * | 4/2008 | Wang | 340/479 |
| 2008/0105012 A1 * | 5/2008 | Poppell | 70/279.1 |
| 2008/0205061 A1 * | 8/2008 | Holder et al. | 362/257 |
| 2008/0218328 A1 * | 9/2008 | Chiu | 340/468 |
| 2008/0238636 A1 * | 10/2008 | Birging et al. | 340/426.1 |
| 2009/0115594 A1 * | 5/2009 | Han | 340/471 |
| 2009/0256697 A1 * | 10/2009 | Tallinger | 340/472 |
| 2009/0290348 A1 * | 11/2009 | Van Laanen et al. | 362/249.02 |
| 2010/0085181 A1 * | 4/2010 | Brooking et al. | 340/468 |
| 2010/0194556 A1 * | 8/2010 | LaRosa | 340/471 |
| 2010/0257738 A1 * | 10/2010 | Gray et al. | 29/897.2 |
| 2010/0265058 A1 * | 10/2010 | Aretuo | 340/472 |
| 2011/0146621 A1 * | 6/2011 | Weisz et al. | 123/339.18 |
| 2012/0138318 A1 * | 6/2012 | Weisz et al. | 169/24 |

* cited by examiner

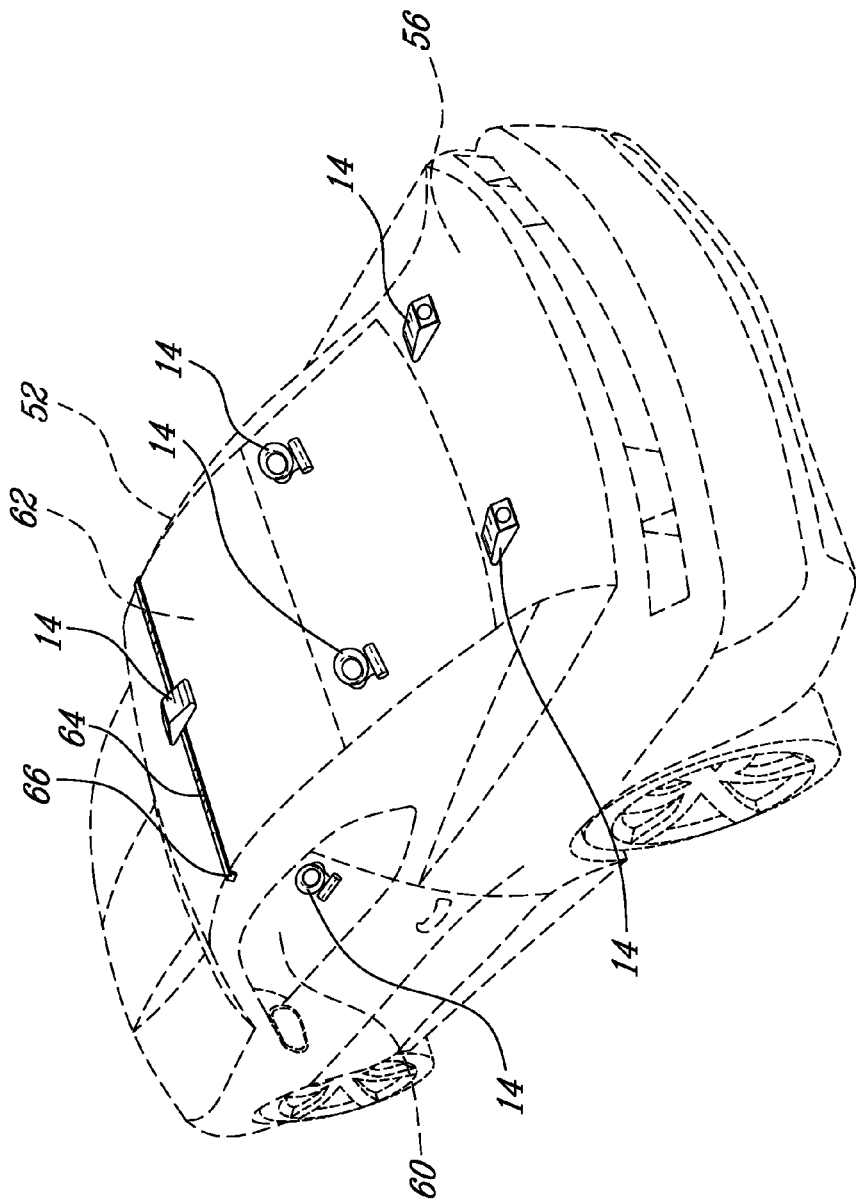

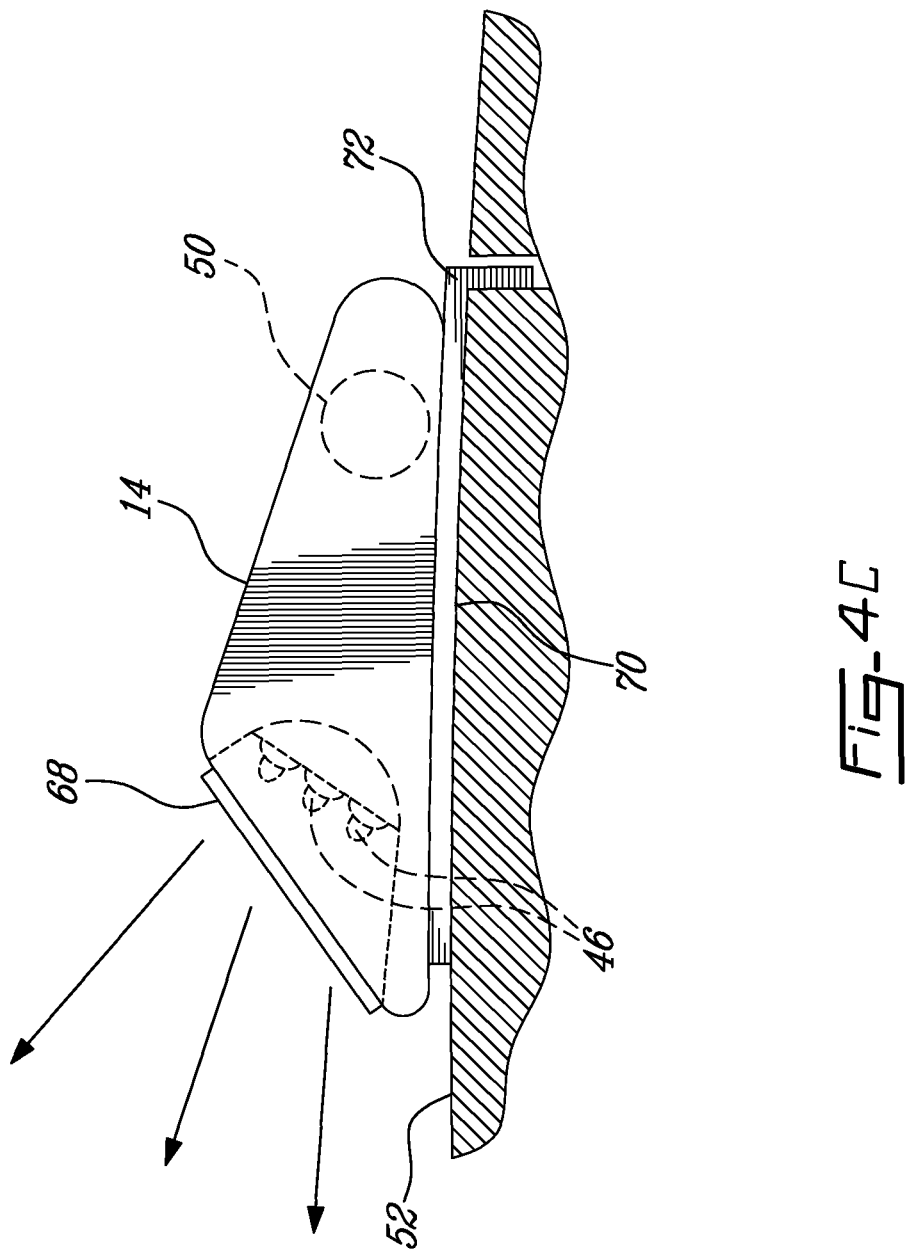

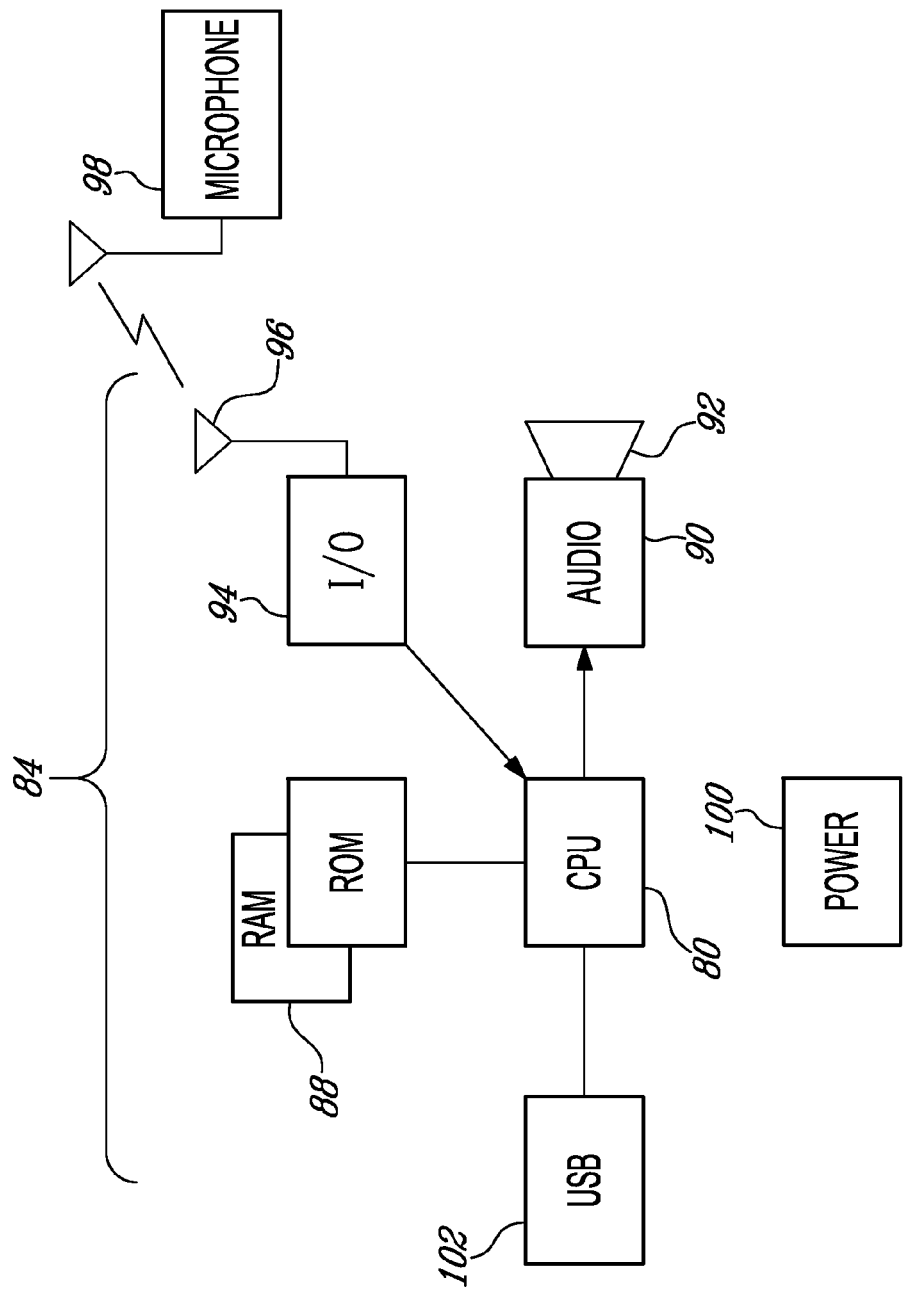

MESH LIGHTING SYSTEM FOR EMERGENCY VEHICLES

CROSS REFERENCE TO RELATED APPLICATIONS

This application claims benefit, under 35 U.S.C. §119(e), of U.S. provisional application Ser. No. 61/296,587, filed on Jan. 20, 2010 which is incorporated herein in its entirety by reference.

FIELD OF THE INVENTION

The present invention relates to a mesh lighting system for emergency vehicles. In particular, the present invention relates to portable wireless lighting system suitable for retrofit in a conventional vehicle such as a rental car without requiring modifications to the vehicle.

BACKGROUND OF THE INVENTION

Emergency vehicles such as police cars, ambulances and the like are typically equipped with visual signalling such as flashing lights and strobes, to indicate their presence to other road users. Such flashing lights and strobes are typically hardwired into the electrical system of the vehicle in question. Other such lights may be retrofit by attaching a light unit to the automobile and taking advantage, for example, of an appropriate adapter inserted into the lighter outlet.

One drawback of such systems is that they typically require modification to the vehicles electrical system. This provides difficulties, for example, when security or emergency personnel are operating in regions where the vehicles must be temporarily leased and where modification of the vehicle in question proves an unsuitable alternative. Additionally, existing retrofit units typically comprise a control/power unit and one or more lighting units interconnected using wires. Such retrofit units are cumbersome and difficult to employ on a large variety of vehicles given the difference in distances between the control/power unit and the light sources. Also, as the control/power unit is within the automobile and the light sources typically on the outside of the vehicle, a cable must pass through an open window or door jamb which leads to a substandard implementation.

Another drawback is that prior art retrofit systems typically include a large light bar which is cumbersome, not readily portable and difficult to attach to many vehicles which might otherwise be used by emergency personnel.

What is needed therefore, and an object of the present invention, is a lighting system for emergency vehicles comprising a variety of signalling light sources synchronised using a wireless communication system.

SUMMARY OF THE INVENTION

In order to address the drawbacks of the prior art, there is provided a mesh lighting system for emergency vehicles. The system comprises a plurality of independent signalling light sources each supplied by a dedicated source of energy, a control module, a low powered wireless network connecting the control module with the plurality of light sources, wherein the plurality of independent signalling light sources emit at least one light flash in response to a control signal received from the control module.

There is also disclosed a method for retrofitting a vehicle with an emergency lighting system. The method comprises providing a plurality of independent signalling light sources each supplied by a dedicated source of energy and placing the light sources about the vehicle so they are visible from a vehicle exterior, each independent signalling light sources comprising a fastener for fastening to the vehicle, and interconnecting each of the independent signalling light sources with a control module using a low powered wireless network. Each of the plurality of independent signalling light sources emits at least one light flash in response to a control signal received from the control module via the low powered wireless network.

Additionally, there is disclosed a portable kit lighting system for emergency vehicles. The kit comprises a plurality of independent signalling light sources each comprising a dedicated standardised battery, a control module, a sound emitting source, a plurality of replacement batteries, an instruction manual, and a rugged sealable plastic box comprising a foam liner comprising a series of cut-outs configured, one of each of the cut-outs for receiving a respective one of the plurality of independent signalling light sources, the control module, the sound emitting source and the plurality of replacement batteries.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

FIG. 4B is a left rear raised perspective view of a mesh lighting system mounted on a vehicle in accordance with an illustrative embodiment of the present invention;

FIG. 4C is a left side view of a light source mounted to a vehicle using a magnet and clip in accordance with an illustrative embodiment of the present invention;

FIG. 5 is a schematic diagram of the electronics of a horn module in accordance with an illustrative embodiment of the present invention.

DETAILED DESCRIPTION OF THE ILLUSTRATIVE EMBODIMENTS

Figure 1:
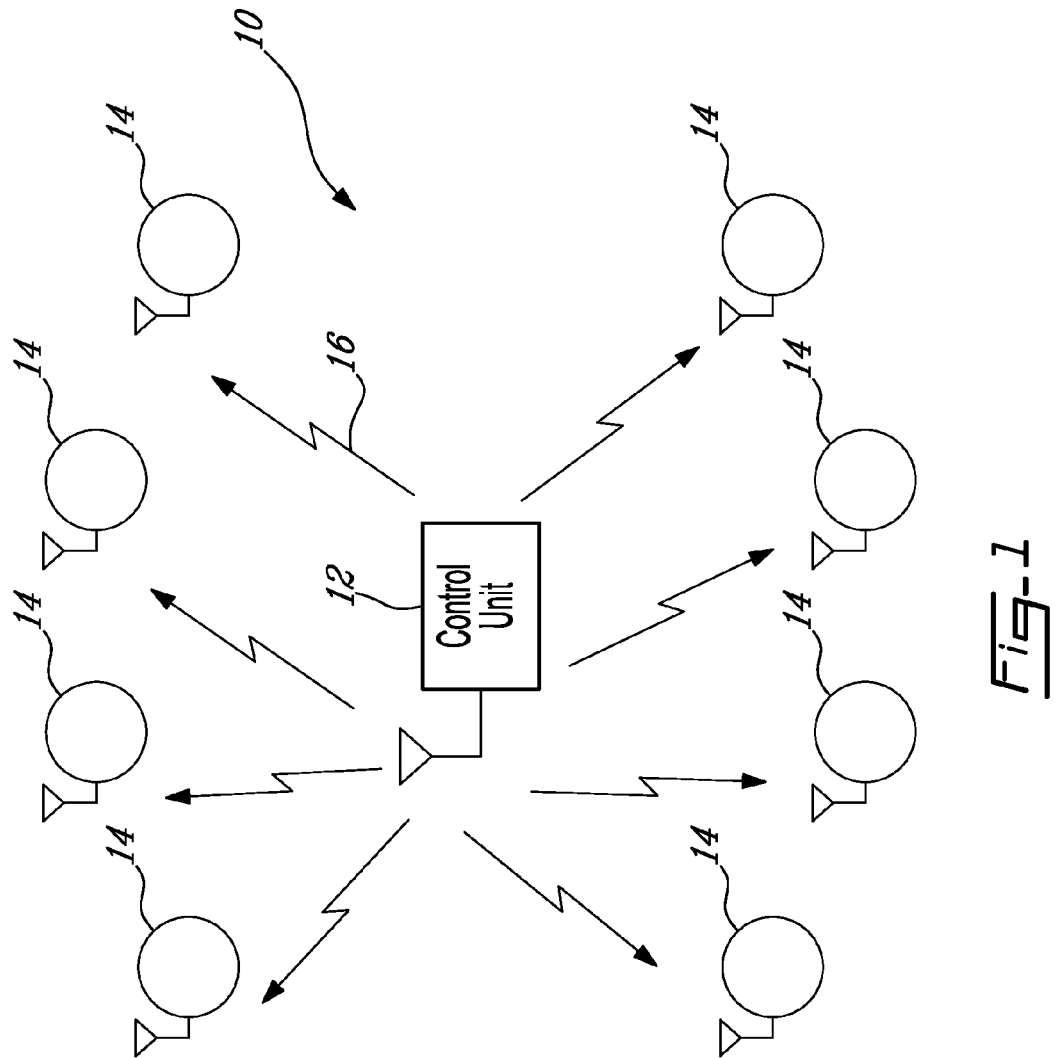
FIG. 1 is a schematic diagram of a mesh lighting system in accordance with an illustrative embodiment of the present invention.

Referring now to FIG. 1, and in accordance with an illustrative embodiment of the present invention, a mesh lighting system, generally referred to using the reference numeral 10, will now be described. The mesh lighting system is illustratively comprised of a control unit 12 and a plurality of small portable self powered light sources 14 interconnected using wireless communication links as in 16 for the transfer of control signals.

Still referring to FIG. 1, although the present illustrative embodiment discloses a distinct control unit 12 for powering the plurality of light sources 14, in an alternative embodiment one of the light sources 14 would act as a master and provide the requisite control with the remaining light sources as in 14 slaved to the master.

Figure 2:
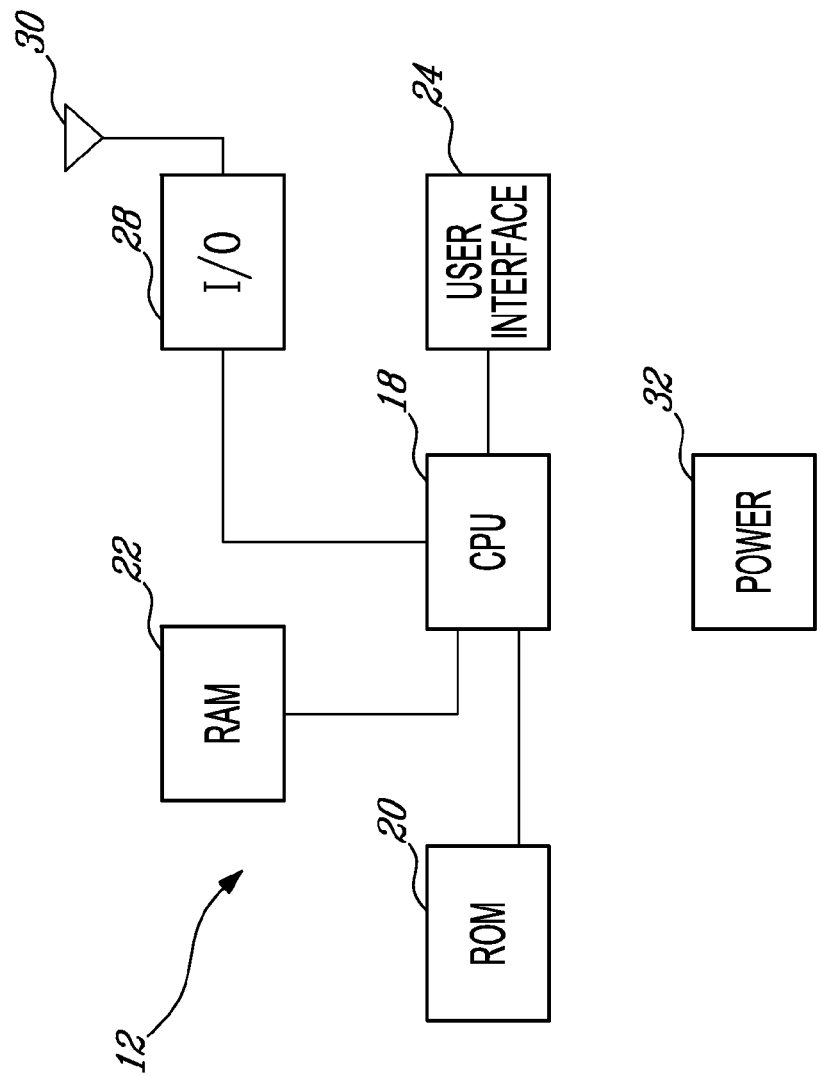
FIG. 2 is a schematic diagram of a control unit for use in a mesh lighting system in accordance with an illustrative embodiment of the present invention.

Referring to FIG. 2, the control unit 12 is illustratively microprocessor controlled and comprises a Central Processing Unit (CPU) 18 and supportive memory (Read Only Memory, ROM, 20, and Random Access Memory, RAM, 22). The ROM 20 has typically stored therein basic operating software, default settings and the like. RAM 22, which can be in the form of non-volatile static RAM or flashable EEPROM or the like, allows for the provision of software updates, user settings, and the like. The RAM 22 can be included on board the control unit 12 or introduced via a flash card interface (not shown), for example through provision of a suitable Micro SD interface or the like. Alternatively a USB interface could be provided (also not shown) and additional RAM 22 provided using a memory stick or the like. The controller also includes a User Interface 24, such as a keypad and display, touch screen, or other suitable interface means for allowing the user to input requisite control and configuration information and receive information regarding device status, battery power and the like. Additionally, an Input/Output, I/O, transceiver 28 and antennae 30 is provided for interconnecting the control unit 12 with the plurality of light sources (references 14 in FIG. 1) in order to provide the requisite control signals. The transceiver 28 is preferably limited to a secure short range operation, for example using Bluetooth™, Zigbee or the like, or could be provided via for example via a low power wireless ad hoc network.

Still referring to FIG. 2, in a particular embodiment the I/O transceiver 28 can also provide an interface for updating the ROM 20 and RAM 22, for example in the case of software updates and the like, and function as a means for interconnecting a portion of the user interface 24 with the CPU 18 (for example, through provision of a Bluetooth™ transceiver and Bluetooth™ compatible input and output devices).

Still referring to FIG. 2, a power source 32 is illustratively also provided for powering the control unit 12, for example a battery or the like. In a particular embodiment power could also be provided through an external means such as an appropriate adaptor for insertion into the in-car cigarette lighter socket (both not shown).

In an illustrative embodiment the control unit 12 is in the form of a key fob or the like and wherein the user interface 24 comprises one or more buttons (not shown) for controlling the operation light sources as in 14. In a particular embodiment, the control unit would comprise four (4) buttons, for example for turning the system on and off, for illuminating the various independent light sources as in 14 as well as, as will be seen below, controlling emission of sounds from the sound emitting source. Illustratively, combinations of buttons could be used to place the mesh lighting system 10 in different modes.

Figure 3:
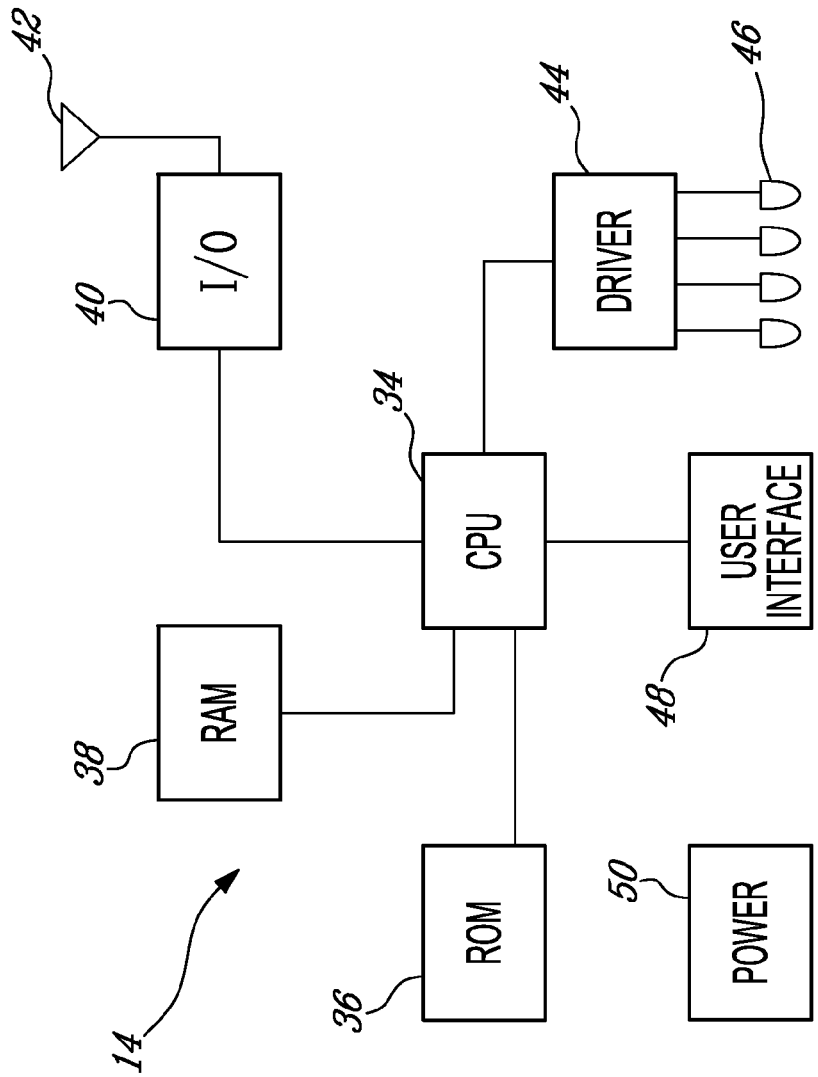
FIG. 3 is a schematic diagram of a light source for use in a mesh lighting system in accordance with an illustrative embodiment of the present invention.

Referring to FIG. 3, similar to the control unit 12, each of the plurality of light sources 14 illustratively is microprocessor controlled and comprises a Central Processing Unit (CPU) 34 and supportive ROM 36 and RAM 38. Again, the ROM 36 has typically stored therein basic operating software, default settings and the like. RAM 38, which can be in the form of non-volatile static RAM or flashable EEPROM or the like, allows for the provision of software updates, user settings, and the like. The RAM 38 can be included on board the light source 14 or introduced via a flash card interface (not shown), for example through provision of a suitable Micro SD interface or the like.

Still referring to FIG. 3, the light source 14 further comprises an Input/Output, or I/O, transceiver 40 and antenna 42 for communication with the control unit 12 and via which the control unit 12 provides control signals. The control signals are used by the CPU 34 in combination with an LED driver 44 to selectively illuminate one or more LEDs as in 46. Illustratively, the LEDs 46 are driven by the CPU 34 and driver 44 to illuminate, for example, in one of a variety of colours, intensities, periodicity and the like, each of which may be dictated by the control signals received from the control unit 12. A typical illumination for police operations, for example, would comprise a combination of red and blue LEDs operating with a strobe effect.

Still referring to FIG. 3, the light source 14 further comprises a user interface 48, typically comprising at least an on/off switch but additionally could further comprise a means for introducing user configuration information, for example by selecting a particular signalling mode or the like. Similar to the control unit, the user interface 48 could be provided in part via the I/O transceiver 40, for example through provision of a Bluetooth™ compatible interface and one or more Bluetooth™ compatible user input devices (not shown).

Still referring to FIG. 3, a local source of power 50 is also provided, for example a battery or the like.

Figure 4A:
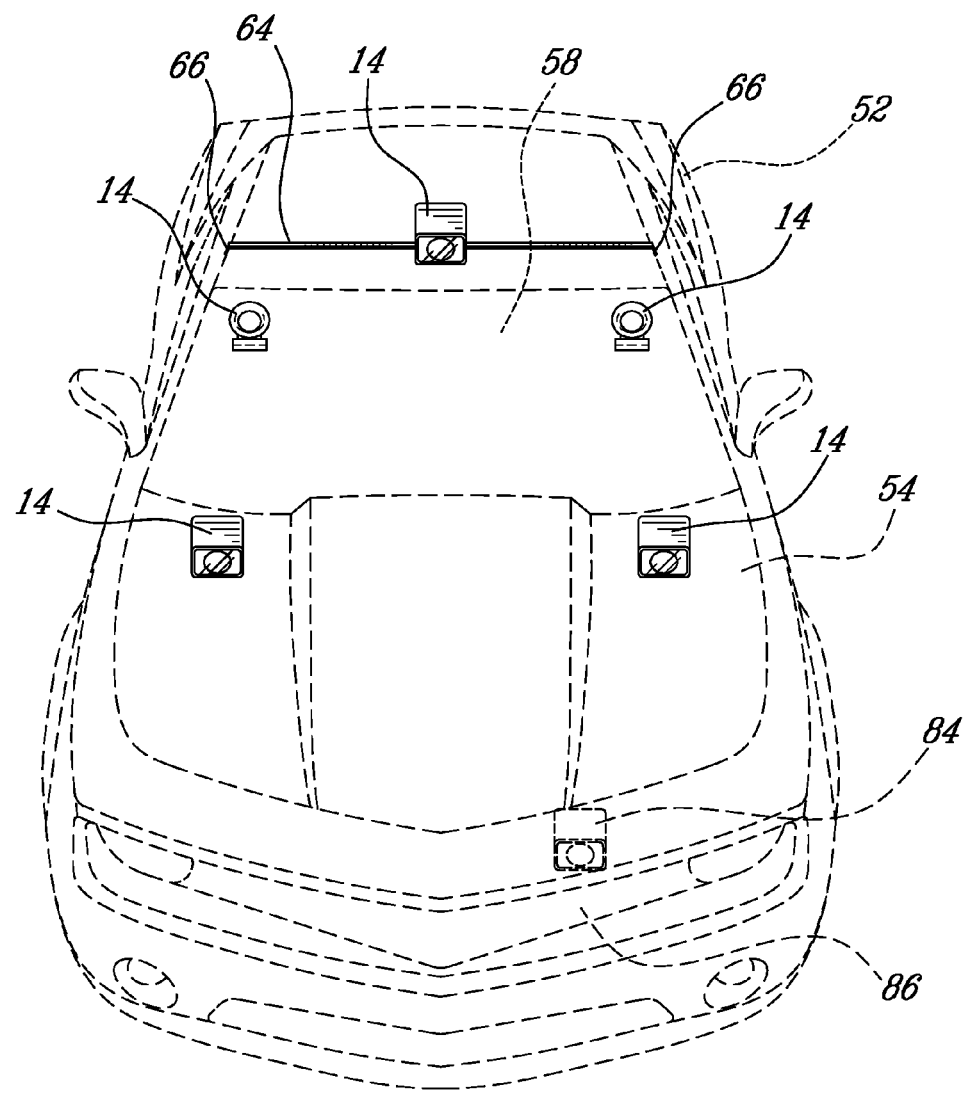
FIG. 4A is a front raised perspective view of a mesh lighting system mounted on a vehicle in accordance with an illustrative embodiment of the present invention.

Referring now to FIGS. 4A and 4B, the mesh light sources 14 are placed about the vehicle 52 at strategic locations for example on the hood 54 or trunk 56 or behind the windscreen 58 and windows 60 or on the roof 62 (using for example a belt 64 and clip 66 assembly as shown inserted into the door frame or gutters of the vehicle 52, as indicated.

Referring now to FIG. 4C, an exemplary embodiment of the light source 14 comprising one or more LEDs 46 covered by a protective lens 68 and a power source 50 for attachment to the outer surface of the vehicle 52 is provided. In this regard, the light source 14 can be secured to ferrous metal surfaces using a rare earth magnet 70 or the like attached to a rearward side of the light source 14. In alternative embodiments suctions cups or adhesive materials such as double side tape or Velcro (all not shown) could also be used. Additionally, in order to improve the adherence of the light 14 to the vehicle an anti-sliding clip 72 can be provided which is adapted for insertion, for example, and referring to FIG. 4A in addition to FIG. 4C, between the hood 54 and windscreen 58 or, with reference to FIG. 4B in addition to FIG. 4C, in the gap between the trunk 56 and the vehicle 52 as indicated.

Figure 4D:
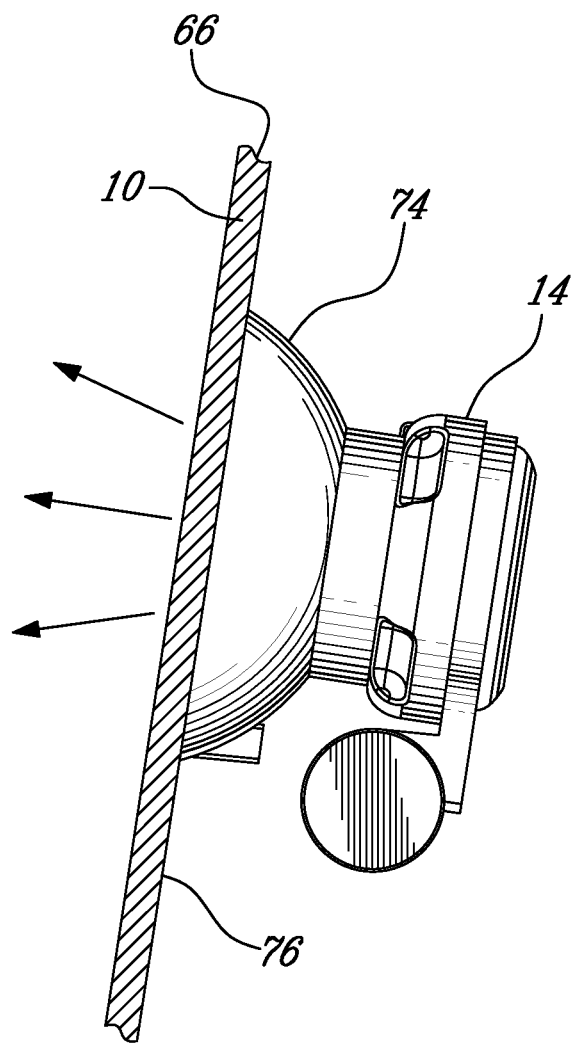
FIG. 4D is a left side view of a light source mounted to a window on the inside of a vehicle using an adhesive shroud in accordance with an illustrative embodiment of the present invention.

Referring now to FIG. 4D, in accordance with a first alternative embodiment of a light source 14 and in order to attach the light sources 14 to the inside of one of the windows 66, the light source 14 can be additionally equipped with an adhesive shroud 74 which secures the light to the inside 76 of the window 66 using suction such that the light is propagated outward through the window 66. An exemplary version of such a light and shroud can be found in co-owned U.S. Provisional Application No. 61/178,255 filed on May 14, 2009 which is incorporated herein by reference in its entirety.

Figure 4E:
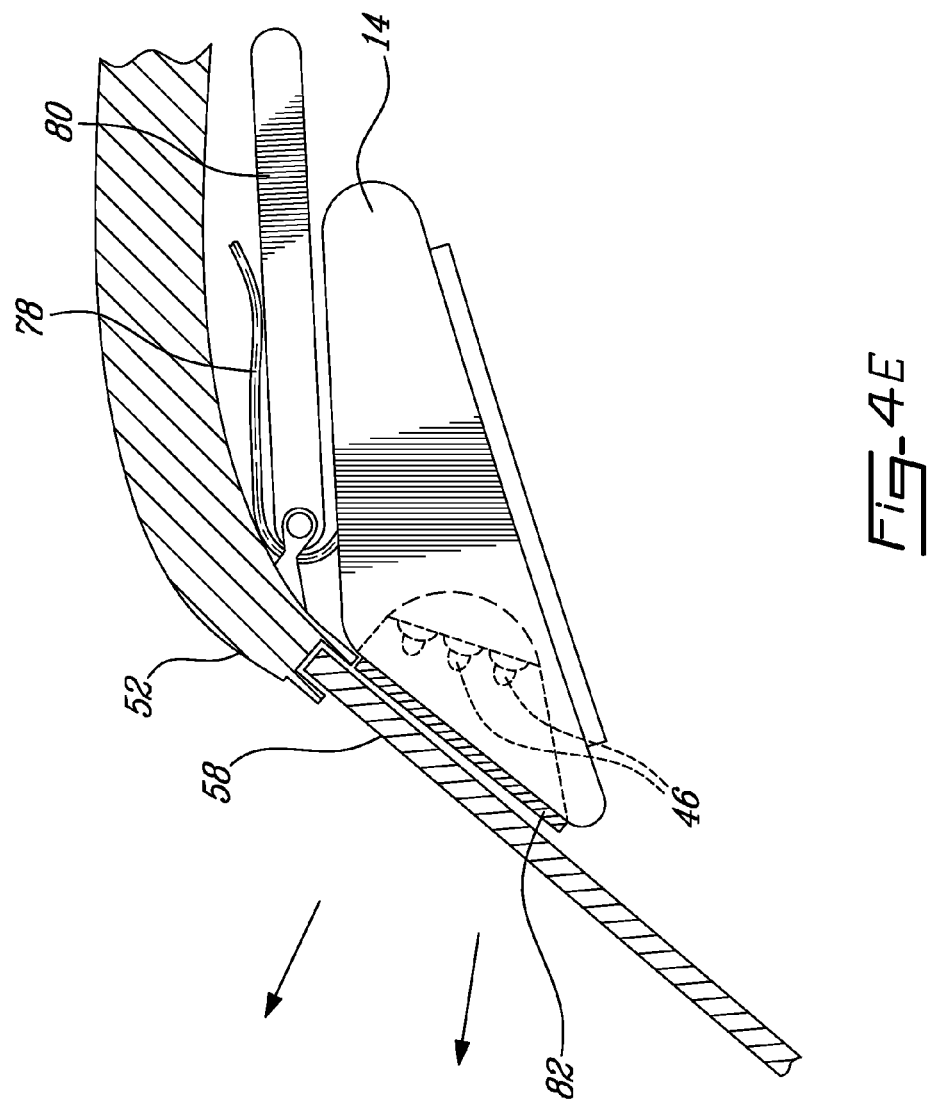
FIG. 4E is a left side view of a light source mounted to a visor behind the windscreen on the inside of a vehicle using a clip in accordance with an illustrative embodiment of the present invention.

Referring now to FIG. 4E, in accordance with a second alternative embodiment of a light source 14 and in order to attach the light sources 14 to the inside of the vehicle 52 and behind the windscreen 58, a visor clip 78 is provided for securing the light source 14 to the visor 80. Additionally, soft rubber seal 82 can be provided which sits snugly against the inside of the windscreen 58 allowing for suction and a cushioning seal while reducing glare and the like from the LEDs 46.

Referring to FIG. 5 in addition to FIG. 4A, in an alternative embodiment a warning sound source 84 such as a horn module would also be provided for behind the front grill 86 of the vehicle and would be activated remotely by the control unit 12. The warning sound source 84 would illustratively comprise a CPU 86, ROM/RAM 88, an audio interface 90 including at least one speaker 92 for generating audio signals and an I/O transceiver 94 (such as a Bluetooth™ transceiver) comprising an antenna 96 for communicating with the control unit 12 and other external devices such as microphone enabled device 98 and the like. The ROM has typically stored therein basic operating software, default settings and the like and the RAM, which can be in the form of non-volatile static RAM or flashable EEPROM or the like, allows for the provision of software updates, user settings, and the like as well as default audio strings such as sirens, horns, etc.

Still referring to FIG. 5, in a particular embodiment the warning sound source 84 would be patched into the battery (not shown) of the vehicle 52 but could also be provided with an independent power source 100. The warning sound source 84 could also include a means, such as a USB interface 102 or the like, for downloading customised horn sounds to the warning sound source 84, for example using MP3 files or the like. Additionally, the I/O transceiver 94 (such as a Bluetooth™ transceiver) could be provided and the user provided with a microphone enabled device 98, such that the warning sound source 84 could be used to wirelessly receive, amplify and subsequently broadcast voice.

Figure 6:
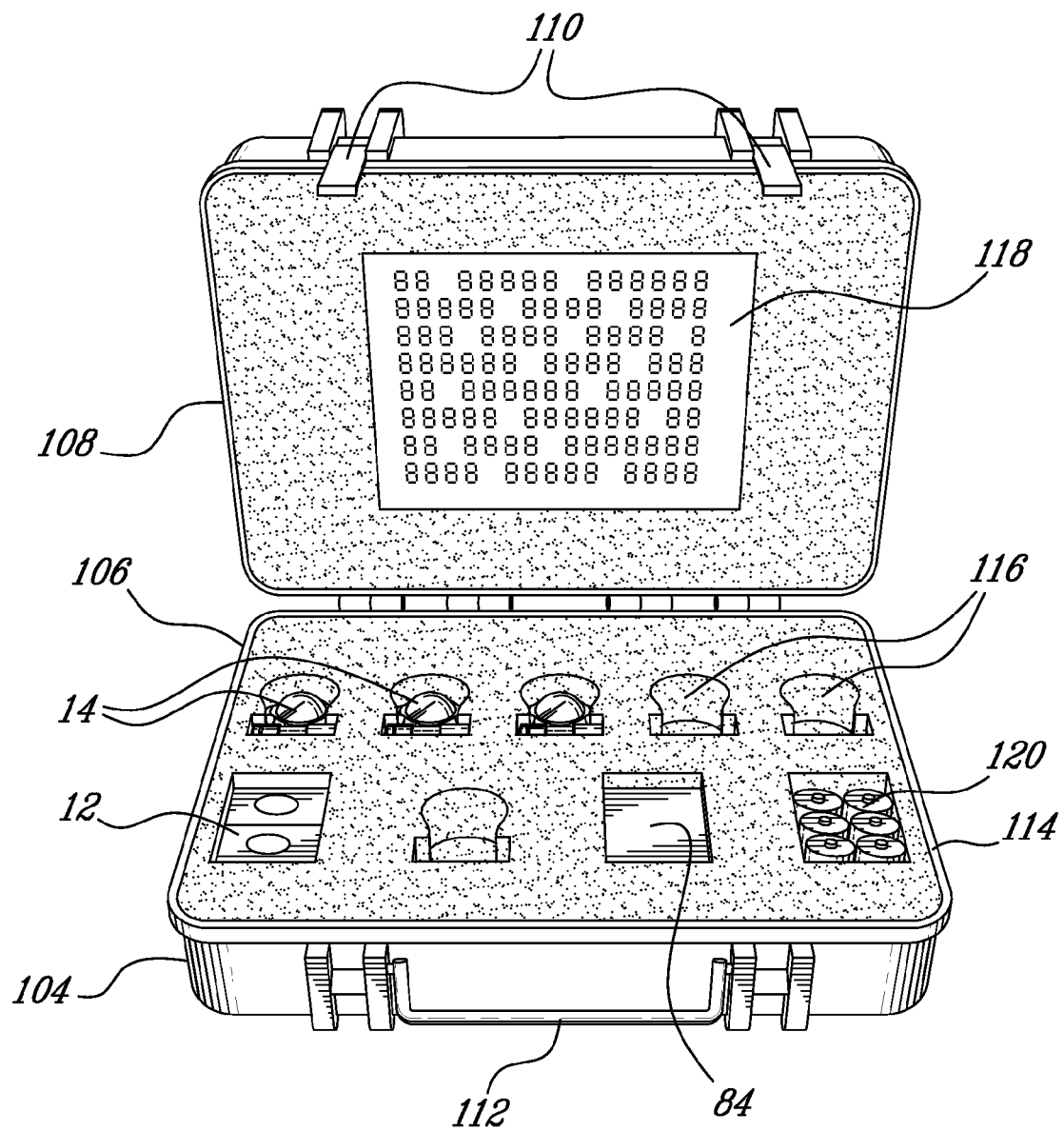
FIG. 6 is a raised front view of a kit comprising a mesh lighting system and instructions for operation in accordance with an illustrative embodiment of the present invention.

Referring now to FIG. 6, the various components of the mesh lighting system 10, i.e. the control unit 12, light sources as in 14 and warning sound source 84, are illustratively packed into a convenient rugged plastic box 104, illustratively comprising a base 106, lid 108, lockable latches 110, a carrying handle 112 and a padded foam liner 114 with customized cut-outs 116 for receiving the various components. A series of instructions 118 are included therein regarding the use and maintenance of the components mesh lighting system 10 as well as supplementary batteries as in 120 for powering the various devices.

Although the present invention has been described hereinabove by way of specific embodiments thereof, it can be modified, without departing from the spirit and nature of the subject invention as defined in the appended claims.

What is claimed is:

1. A mesh lighting system for an emergency vehicle comprising a vehicle electrical system, the system comprising:
   a plurality of batteries unconnected to the vehicle electrical system and a plurality of independent signalling light sources each comprising a blue LED and a red LED, each of said light sources comprising a receiver and powered by a different dedicated collocated one of said batteries;
   a control module comprising a transmitter;
   a low powered wireless network for wirelessly connecting said control module transmitter with each of said plurality of receivers; and
   a toolless fastener for removeably attaching each of said light sources and their respective dedicated collocated battery to the vehicle;
   wherein each of said plurality of independent signalling light sources emits a flashing blue and red light sequence in response to a control signal received from said control module via said low powered wireless network.

2. The mesh lighting system of claim 1, wherein said low powered wireless network is a Bluetooth network.

3. The mesh lighting system of claim 1, further comprising at least one sound emitting source, wherein said sound emitting source emits a pre-recorded sound in response to a control signal received from said control module.

4. The mesh lighting system of claim 3, further comprising a microphone and an interconnection between said sound emitting source and said microphone for transmitting sounds received by said microphone to said sound emitting source, said sound emitting source emitting said transmitted sounds.

5. The mesh lighting system of claim 4, wherein said interconnection is provided by a Bluetooth network.

6. The mesh lighting system of claim 1, wherein said fastener is a magnet.

7. The mesh lighting system of claim 1, wherein said fastener is a visor clip.

8. The mesh lighting system of claim 1, wherein said fastener comprises a belt and clip assembly for attaching at least one of said light sources to a roof of the vehicle.

9. The mesh lighting system of claim 1, wherein said fastener is a suction cup.

10. The mesh lighting system of claim 9, wherein each of said plurality of independent light sources comprises a translucent lens covering said LEDs, wherein said suction cup comprises an inner adhering surface and wherein said translucent lens is positioned towards a centre of said suction cup such that when said inner adhering surface is pressed against a window of the vehicle, said inner surface is retained against the window by a suction force and light emitted by said light source propagates through the window.

11. A method for retrofitting a vehicle comprising a vehicle electrical system with an emergency lighting system comprising:
    providing a plurality of batteries unconnected to the vehicle electrical system and a plurality of independent signalling light sources each comprising a blue LED, a red LED and a receiver;
    supplying power to each of said light sources from a different dedicated collocated one of said batteries;
    removeably attaching each of said light sources and their respective dedicated collocated battery about the vehicle with a toolless fastener and such that said light sources are visible from a vehicle exterior; and
    interconnecting a receiver of each of said independent signalling light sources with a transmitter of a control module using a low powered wireless network;
    wherein each of said plurality of independent signalling light sources emits a flashing blue and red light sequence in response to a control signal received via said receiver from said control module transmitter via said low powered wireless network.

12. The method for retrofitting a vehicle with an emergency lighting system of claim 11, further comprising providing a sound emitting source and interconnecting said sound emitting source with said control module using said low powered wireless network wherein said sound emitting source emits a pre-recorded sound in response to a control signal received from said control module.

13. The method for retrofitting a vehicle with an emergency lighting system of claim 11, further comprising positioning at least one of said independent signalling light sources such that they are directed rearwards relative to the vehicle and at least one of said independent signalling light sources such that they are directed forwards relative to the vehicle.

14. The method for retrofitting a vehicle with an emergency lighting system of claim 13, further comprising positioning a pair of said independent signalling light sources such that they are directed sideways relative to the vehicle and in a direction opposite to one another.

15. The method for retrofitting a vehicle with an emergency lighting system of claim 13, further comprising positioning at least one of said independent signalling light sources on a roof of the vehicle.

* * * * *